(12) United States Patent
Chaudhury et al.

(10) Patent No.: US 9,412,024 B2
(45) Date of Patent: Aug. 9, 2016

(54) VISUAL DESCRIPTORS BASED VIDEO QUALITY ASSESSMENT USING OUTLIER MODEL

(71) Applicant: Interra Systems, Inc., Cupertino, CA (US)

(72) Inventors: Santanu Chaudhury, New Delhi (IN); Brejesh Lall, New Delhi (IN); Rohit Mungre, Indore (IN); Yogesh Singh, Narnaul (IN); Shekhar Madnani, Noida (IN)

(73) Assignee: Interra Systems, Inc., Cupertino, CA (US)

( * ) Notice: Subject to any disclaimer, the term of this patent is extended or adjusted under 35 U.S.C. 154(b) by 578 days.

(21) Appl. No.: 14/027,123

(22) Filed: Sep. 13, 2013

(65) Prior Publication Data

US 2015/0078654 A1    Mar. 19, 2015

(51) Int. Cl.
| | |
|---|---|
| *G06K 9/00* | (2006.01) |
| *G06T 7/00* | (2006.01) |
| *G06K 9/03* | (2006.01) |
| *G06K 9/46* | (2006.01) |

(52) U.S. Cl.
CPC ........ *G06K 9/00765* (2013.01); *G06K 9/00744* (2013.01); *G06K 9/036* (2013.01); *G06T 7/0002* (2013.01); *G06K 9/4604* (2013.01); *G06T 2207/10016* (2013.01); *G06T 2207/30168* (2013.01)

(58) Field of Classification Search
CPC .......... G06K 9/00744; G06K 9/00765; G06K 9/036; G06K 9/4604; G06T 7/0002; G06T 2207/10016; G06T 2207/30168
See application file for complete search history.

(56) References Cited

U.S. PATENT DOCUMENTS

| | | | | |
|---|---|---|---|---|
| 7,812,857 | B2 * | 10/2010 | Bourret ................. | G06T 7/0002 348/177 |
| 8,358,704 | B2 * | 1/2013 | Shi ................. | H04N 21/234381 375/240.27 |
| 8,488,915 | B2 * | 7/2013 | Jayant ................... | G06T 7/0004 375/240.01 |
| 2014/0372348 | A1 * | 12/2014 | Lehmann ............. | G06K 9/6265 706/12 |

\* cited by examiner

*Primary Examiner* — Edward Park
(74) *Attorney, Agent, or Firm* — Next IP Law Group

(57) ABSTRACT

System and method for identifying erroneous videos and assessing video quality is provided. Feature vectors are generated corresponding to a plurality of frames associated with the one or more videos. The feature vectors are subsequently subjected to anomaly detection to obtain first and second normalized path lengths and normalized anomaly measures. The first and second normalized path lengths and normalized anomaly measures are provided to a regression model to identify the erroneous video.

10 Claims, 9 Drawing Sheets

VISUAL DESCRIPTORS BASED VIDEO QUALITY ASSESSMENT USING OUTLIER MODEL

TECHNICAL FIELD

The present disclosure is generally related to video quality assessment and, more particularly, is related to visual descriptors based video quality assessment using outlier model.

BACKGROUND

Various techniques exist for objectively measuring video quality. These techniques use different approaches for measuring the quality of the video that include one of a full-reference approach, a reduced-reference approach, and a no-reference approach. The full-reference approach to measuring video quality entails comparing characteristics, viz., spectral components, variations energy level variations, energy distributions in the frequency domain, and the like, of a target video with corresponding characteristics of a reference version of the target video, i.e., a reference video. The comparison is performed to detect a possible degradation in either of the above mentioned characteristics caused due to processing and/or transmission of the target video. The results of the comparison are used to obtain a measurement of the perceptual quality of the target video.

To accurately perform video quality assessment, a full-reference approach based system needs to be provided all the characteristics information corresponding to the reference video. However, transmitting characteristics information of the reference video over a network to an endpoint, such as a mobile device, consumes a considerable network bandwidth, rendering the full-reference approach based video quality assessment impractical.

The reduced-reference approach based video quality measurement entails comparison of a reduced number of characteristics corresponding to the target video with that of the reference video to provide a measurement of the perceptual quality of the target video. Thus, the reduced-reference approach requires transmission of reduced amount of characteristics information to the endpoint for performing video quality assessment, thereby reducing network bandwidth requirement. Further, the no-reference approach based video quality measurement does not entail comparison of characteristics information corresponding to the reference and target videos, thereby eliminating the need for transmitting characteristics information corresponding to the reference video over the network.

However, the above described video quality assessment systems are have several shortcomings. For example, the full-reference approach based measurement systems require transmission of substantial amount of characteristics information over the network, thereby leading to congestion during peak load scenarios. Although, the reduced-reference approach based measurement systems require less amount of characteristics information, yet transmitting any extra information leads to loss of precious network bandwidth. Further, the existing video quality measurement models that measure video quality using either of the full-reference, reduced-reference, and no-reference approaches conform only approximately to the human visual system (HVS). Thus, they are not able to provide a video quality estimate that accurately quantifies video quality assessment of a human eye, thereby leading to sub-par viewing experience at the endpoint.

In light of the above, there is a need for an invention that does not require transmission of the characteristics information corresponding to the reference video, that accurately conforms to the HVS, and that eliminates the shortcomings of the conventional video quality measurement models.

SUMMARY

Example embodiments of the present disclosure provide system for identifying an erroneous video from one or more videos. Briefly described, in architecture, one example embodiment of the system, among others, can be implemented as follows: a visual salience extraction module, a scene statistics extraction module, an isolation forest based anomaly detection module, a nearest neighbour based anomaly detection module, a video segmenting and normalization module, and an erroneous video identifying module.

Embodiments of the present disclosure can also be viewed as providing a method for identifying an erroneous video from one or more videos. In this regard, one example embodiment of such a method, among others, can be broadly summarized by the following steps: generating first and second feature vectors for each of the plurality of frames of the one or more videos based on visual salience and scene statistics extraction approaches, respectively, each of the first and second feature vectors includes a plurality of feature data points; performing anomaly detection on the first and second feature vectors based on an isolation forest approach to calculate first and second average path lengths, respectively, corresponding to each of the plurality of frames; performing anomaly detection on the first and second feature vectors based on a nearest neighbour approach to calculate first and second anomaly measures, respectively, corresponding to each of the plurality of frames; segmenting each of the one or more videos into one or more video shots, each of the one or more video shots includes a set of frames; determining first and second sets of average path lengths and first and second sets of anomaly measures corresponding to a first set of frames associated with a first video shot, the first set of average path lengths includes a plurality of first average path lengths calculated corresponding to the first set of frames based on the isolation forest approach and the second set of average path lengths includes a plurality of second average path lengths calculated corresponding to the first set of frames based on the isolation forest approach, the first set of anomaly measures includes a plurality of first anomaly measures calculated corresponding to the first set of frames based on the nearest neighbour approach and the second set of anomaly measures includes a plurality of second anomaly measures calculated corresponding to the first set of frames based on the nearest neighbour approach; determining first and second maximum average path lengths of the first and second sets of average path lengths, respectively; determining first and second maximum anomaly measures of the first and second sets of anomaly measures, respectively; dividing each of the first and second sets of average path lengths with the first and second maximum average path lengths, respectively, to obtain first and second sets of normalized average path lengths; dividing each of the first and second sets of anomaly measures with the first and second maximum anomaly measures, respectively, to obtain first and second sets of normalized anomaly measures; determining a plurality of first and second sets of normalized average path lengths and a plurality of first and second sets of normalized anomaly measures corresponding to one or more sets of frames corresponding to the one or more video shots; and identifying the erroneous video by providing at least one of the plurality of first and second sets of normalized average path lengths and at least one of the plurality of first and second sets of anomaly measures to a regression model including a plurality of model coefficients determined previously using a set of training videos.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present disclosure relates to identifying an erroneous video from one or more videos. The present disclosure discloses methods for processing one or more frames of a video to identify the erroneous video. Feature vectors are generated corresponding to a plurality of frames associated with the one or more videos. The feature vectors are subsequently subjected to anomaly detection to obtain first and second normalized path lengths and normalized anomaly measures. The first and second normalized path lengths and normalized anomaly measures are provided to a regression model to identify the erroneous video. This provides an automated and no-reference approach based error identification and video quality assessment process, thereby making error identification and video quality assessment practical and reliable. In an example embodiment of the present disclosure, the identification of erroneous video can be performed during video transmission, video display, video transcoding, video post-processing, video quality testing and the like. In light of this, the example embodiments of the present disclosure, enable video quality assessment in a quick, accurate, and efficient manner.

Figure 1A:
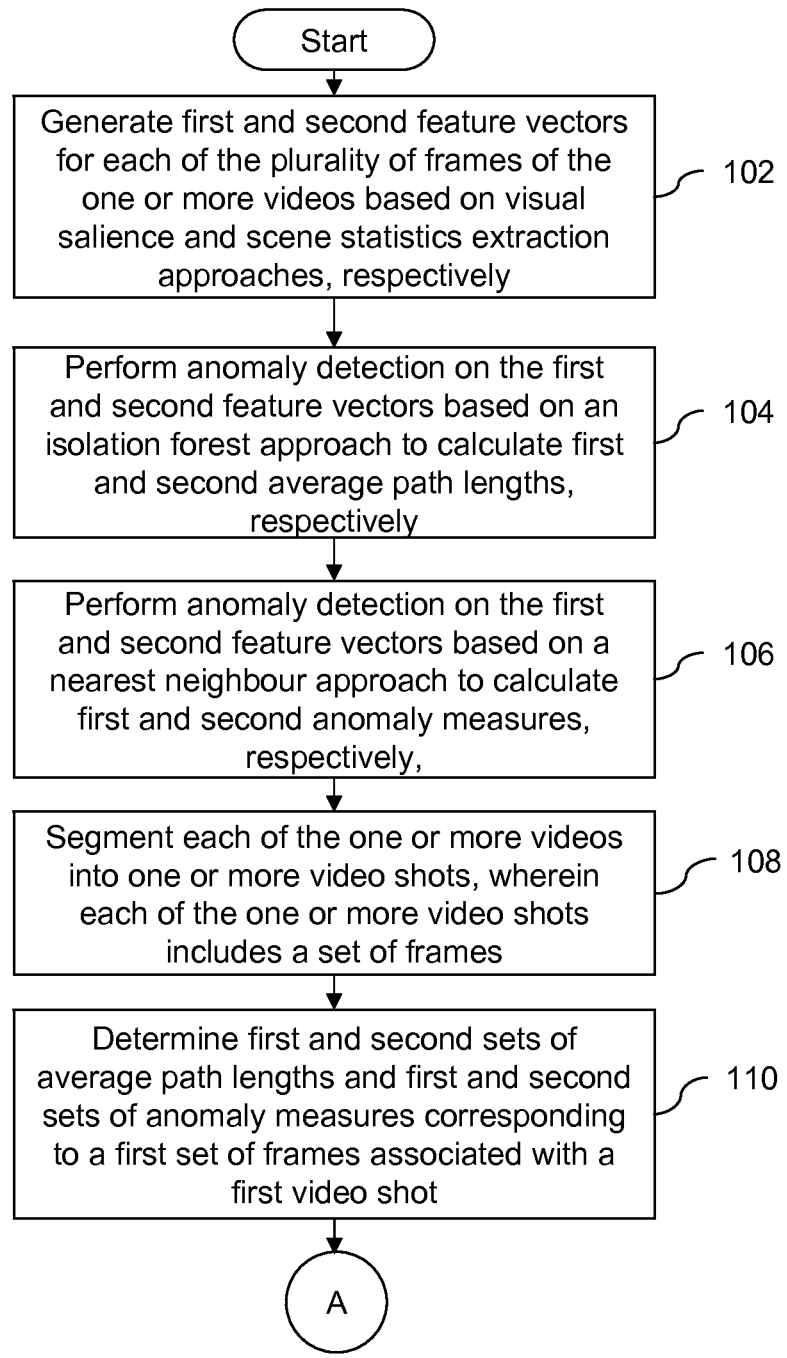
FIGS. 1A and 1B are a flowchart of a method for identifying an erroneous video from one or more videos, in accordance with an example embodiment of the present disclosure.
Figure 1B:
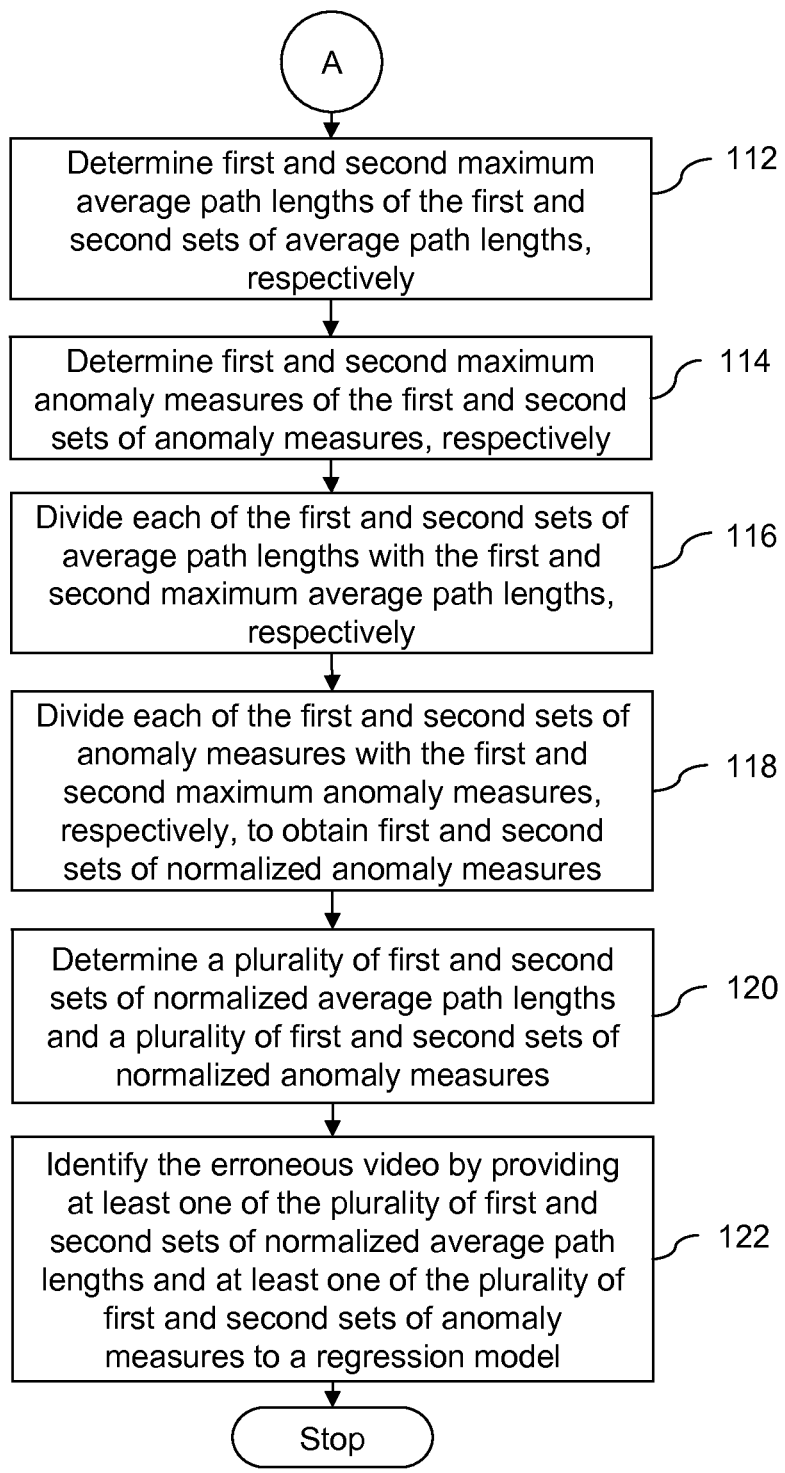

Referring now to FIGS. 1A and 1B, a flowchart of a method for identifying an erroneous video from one or more videos in accordance with an example embodiment of the present disclosure, is shown.

In block 102, first and second feature vectors are generated corresponding to each of a plurality of frames of a video based on visual salience and scene statistics extraction approaches, respectively. Each of the first and second feature vectors includes a plurality of feature data points. In an embodiment of the present invention, the visual salience approach employs rarity conspicuity that obtains the first feature vector based on pulsed cosine transform (PCT) that is derived from discrete cosine transform (DCT) and simulates the lateral surround inhibition of neurons with similar visual features. In an embodiment of the present invention, the visual salience based calculation of the first feature vector includes a histogram based approach and a block based approach (described in detail in conjunction with FIGS. 2 and 3).

In block 104, anomaly detection is performed on the first and second feature vectors based on an isolation forest approach to calculate first and second average path lengths, respectively, corresponding to each of the plurality of frames. The isolation forest based anomaly detection has been explained in detail in conjunction with FIG. 5. In block 106, anomaly detection is performed on the first and second feature vectors based on a nearest neighbor approach to calculate first and second anomaly measures, respectively, corresponding to each of the plurality of frames. The nearest neighbor based anomaly detection has been explained in detail in conjunction with FIG. 6. In block 108, each video is segmented into one or more video shots. Each of the one or more video shots includes a set of frames. In an embodiment of the present invention, a shot boundary is detected based on determining correlation values between histograms of neighboring frames of the video. When correlation values become less than a corresponding threshold a shot boundary is marked at a current frame. The above mentioned method for shot detection will be obvious to those of skill in the art. A detailed description of the same has been therefore excluded from the current description for the sake of brevity.

In block 110, first and second sets of average path lengths and first and second sets of anomaly measures corresponding to a first set of frames associated with a first video shot of the one or more video shots are determined. The first set of average path lengths includes a plurality of first average path lengths calculated corresponding to the first set of frames based on the isolation forest approach and the second set of average path lengths includes a plurality of second average path lengths calculated corresponding to the first set of frames based on the isolation forest approach. The first set of anomaly measures includes a plurality of first anomaly measures calculated corresponding to the first set of frames based on the nearest neighbour approach and the second set of anomaly measures includes a plurality of second anomaly measures calculated corresponding to the first set of frames based on the nearest neighbour approach.

In block 112, first and second maximum average path lengths of the first and second sets of average path lengths are determined. In block 114, first and second maximum anomaly measures of the first and second sets of anomaly measures are determined. In block 116, each of the first and second sets of average path lengths is divided with the first and second maximum average path lengths, respectively, to obtain first and second sets of normalized average path lengths. In block 118, each of the first and second sets of anomaly measures is divided with the first and second maximum anomaly measures, respectively, to obtain first and second sets of normalized anomaly measures. In block 120, a plurality of first and second sets of normalized average path lengths and a plurality of first and second sets of normalized anomaly measures corresponding to one or more sets of frames corresponding to the one or more video shots is determined. In block 122, the erroneous video is identified by providing the plurality of first and second sets of normalized average path lengths and the plurality of first and second sets of anomaly measures to a regression model. In an embodiment of the present invention, the regression model is a logistic regression model and includes a plurality of model coefficients determined previously using a set of training videos. The model coefficients include a plurality of theta parameters that are obtained by minimizing a logarithmic cost function using an optimization algorithm, viz., a gradient descent approach.

Figure 2:
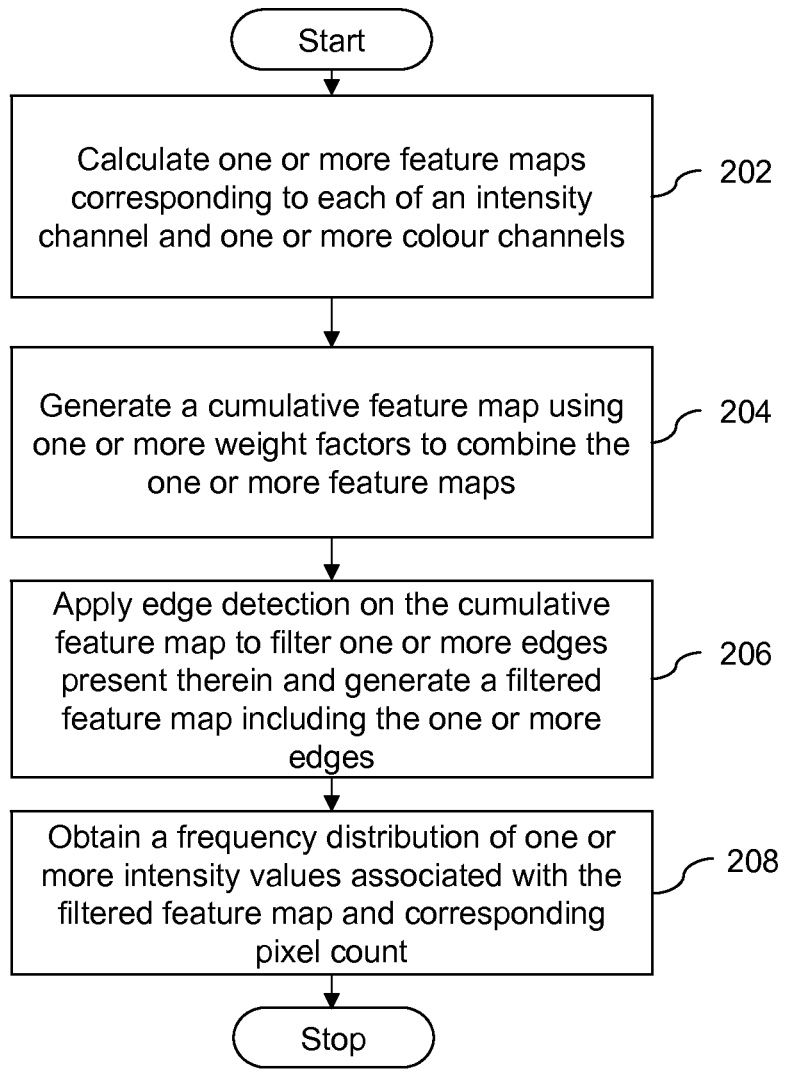
FIG. 2 is flowchart of a method for generating a first feature vector based on visual salience extraction, in accordance with an example embodiment of the present disclosure.

Referring now to FIG. 2, a flowchart of a method for generating a first feature vector based on visual salience extraction approach, in accordance with an example embodiment of the present disclosure is shown.

In block 202, feature maps corresponding to each of an intensity channel and one or more colour channels corresponding to a first frame are calculated. In an embodiment of the present invention, the feature maps are calculated using at least one of a discrete cosine transform (DCT), inverse DCT, and signum functions. In block 204, a cumulative feature map is generated by combining the one or more feature maps using one or more weight factors. In an embodiment of the present invention, the cumulative feature map is a gray-scale image equivalent of the first frame. In block 206, edge detection is applied on the cumulative feature map to filter edges present therein and generate a filtered feature map including the edges. In an embodiment of the present invention, the edges present in the cumulative feature map are filtered using Sobel filter. In block 208, a frequency distribution of one or more intensity values (i.e., a histogram) associated with the filtered feature map and corresponding pixel count is obtained to generate the first feature vector.

Figure 3:
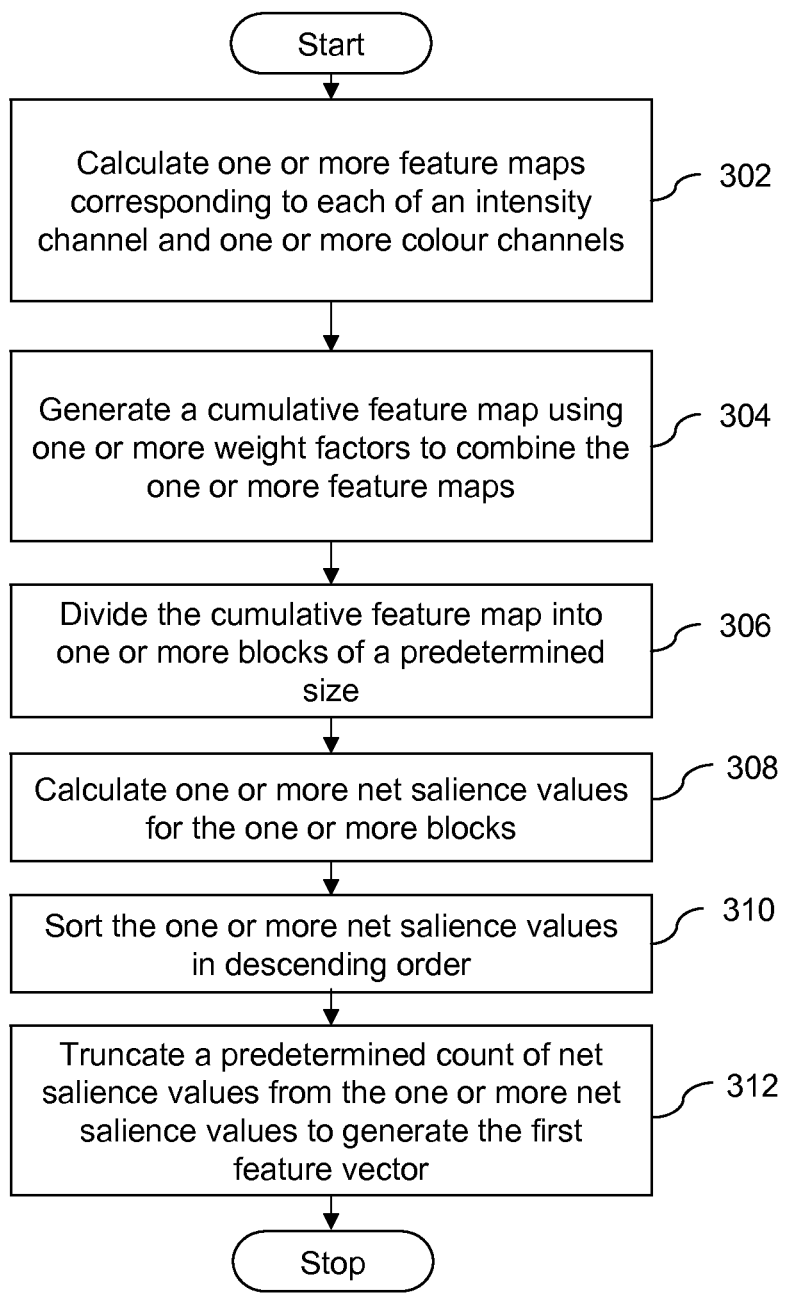
FIG. 3 is a flowchart of a method for generating a first feature vector based on visual salience extraction, in accordance with another example embodiment of the present disclosure.

Referring now to FIG. 3, a flowchart of a method for generating the first feature vector based on visual salience extraction approach, in accordance with another example embodiment of the present disclosure is shown.

In block 302, feature maps corresponding to each of an intensity channel and one or more colour channels corresponding to a first frame are calculated. In an embodiment of the present invention, the feature maps are calculated using at least one of a discrete cosine transform (DCT), inverse DCT, and signum functions. In block 304, a cumulative feature map is generated by combining the one or more feature maps using one or more weight factors. In an embodiment of the present invention, the cumulative feature map is a gray-scale image equivalent of the first frame. In block 306, the cumulative feature map is divided into blocks of a predetermined size. In an embodiment of the present invention, the blocks are square in shape with a side length of 16 pixels. In block 308, net salience values for the blocks obtained above are calculated. The net salience value corresponding to a block is obtained by summing one or more intensity values associated with the block weighted with corresponding pixel count. In block 310, the one or more net salience values obtained corresponding to the blocks are sorted in descending order. In block 312, a predetermined count of net salience values is truncated from the net salience values to generate the first feature vector.

Figure 4A:
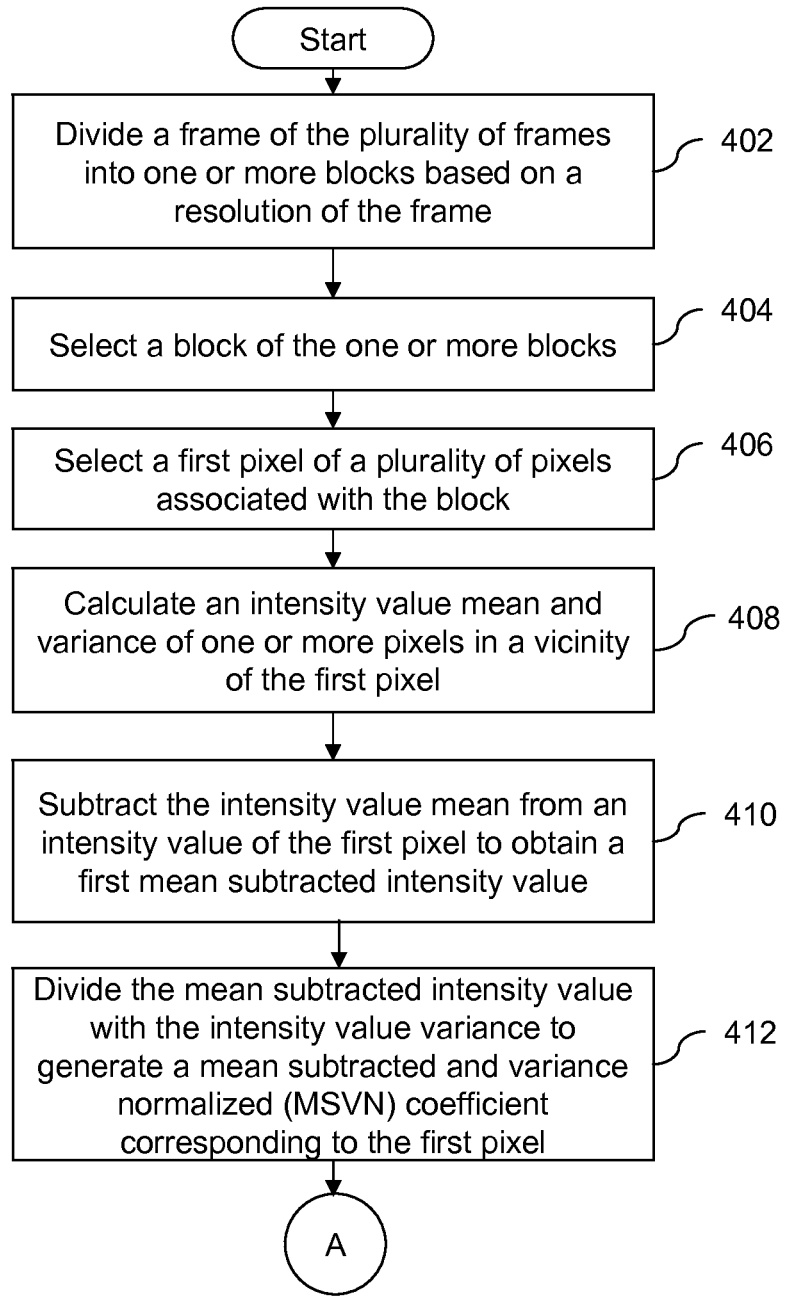
FIGS. 4A and 4B are a flowchart of a method for generating a second feature vector based on scene statistics extraction, in accordance with an example embodiment of the present disclosure.
Figure 4B:
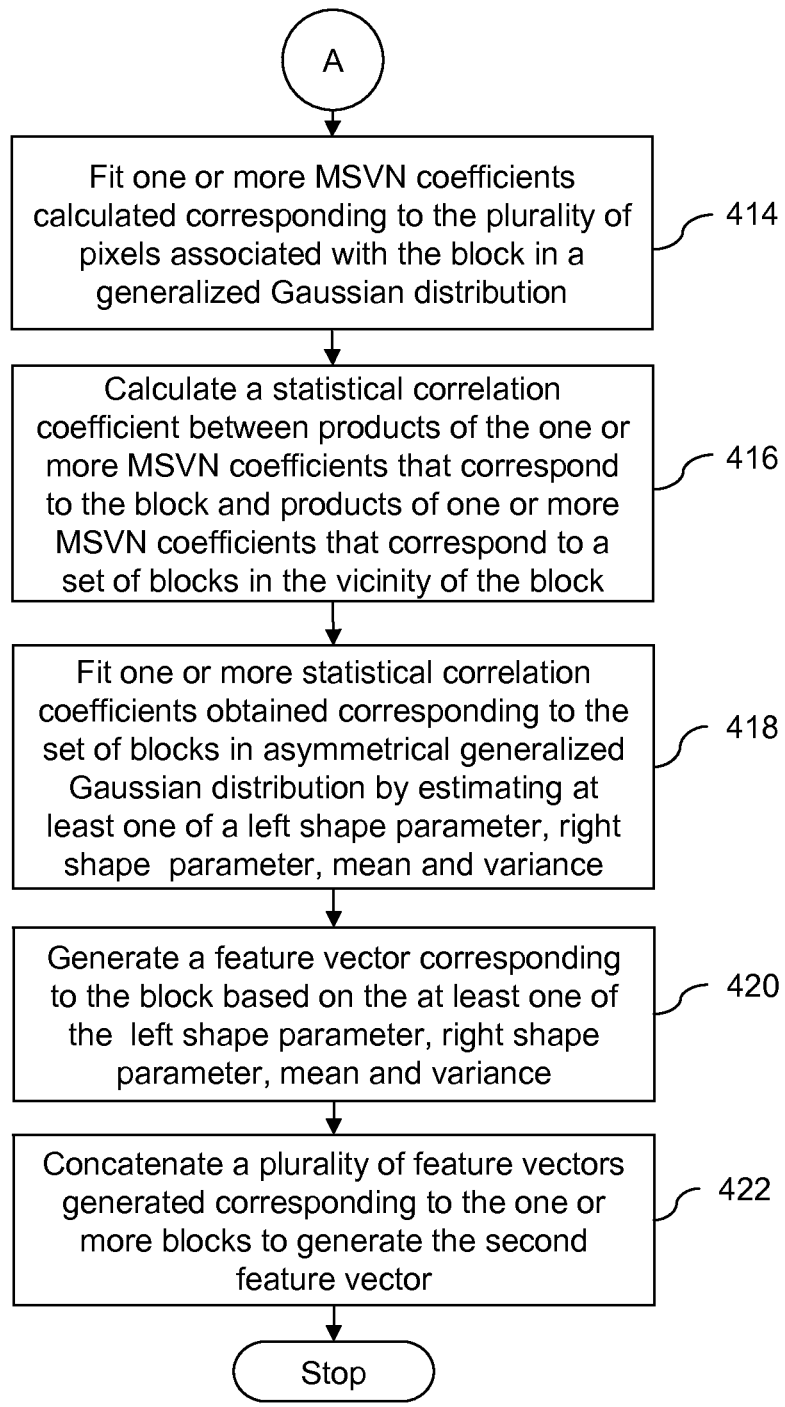

Referring now to FIGS. 4A and 4B, a flowchart of a method for generating a second feature vector based on scene statistics extraction approach, in accordance with an example embodiment of the present disclosure is shown.

In block 402, a frame of the plurality of frames is divided into one or more blocks based on a resolution of the frame. In block 404, a block is selected from the one or more blocks obtained above. In block 406, a first pixel of a plurality of pixels associated with the block is selected. In block 408, an intensity value mean and variance of one or more pixels in a vicinity of the first pixel is calculated. In an embodiment of the present invention, a predetermined count of pixels is selected around the first pixel and the intensity value mean and variance are calculated corresponding to these.

In block 410, the intensity value mean is subtracted from an intensity value of the first pixel to obtain a first mean subtracted intensity value. In block 412, the mean subtracted intensity value is divided by the intensity value variance to generate a mean subtracted and variance normalized (MSVN) coefficient corresponding to the first pixel. The above steps are repeated for all the pixels in the block to generate a plurality of MSVN coefficients. In block 414, the plurality of MSVN coefficients calculated corresponding to the plurality of pixels associated with the block are fitted in a generalized Gaussian distribution by estimating at least one of mean, variance, and one or more shape parameters. In block 416, a statistical correlation coefficient is calculated between products of the plurality of MSVN coefficients that correspond to the block and products of one or more MSVN coefficients that correspond to a set of blocks in the vicinity of the block. In an embodiment of the present invention, at least 4 blocks are selected around the block to calculated product of the corresponding MSVN coefficients. Thereafter, a plurality of statistical correlation coefficients is calculated corresponding to each of the one or more blocks. In block 418, the plurality of statistical correlation coefficients obtained corresponding to the one or more blocks is fitted in asymmetrical generalized Gaussian distribution by estimating at least one of a left shape parameter, right shape parameter, mean and variance. In block 420, a feature vector corresponding to the block is calculated based on the at least one of the left shape parameter, right shape parameter, mean and variance. Likewise a plurality of feature vectors is obtained corresponding to the one or more blocks. In block 422, the plurality of feature vectors generated corresponding to the one or more blocks is concatenated to generate the second feature vector.

Figure 5:
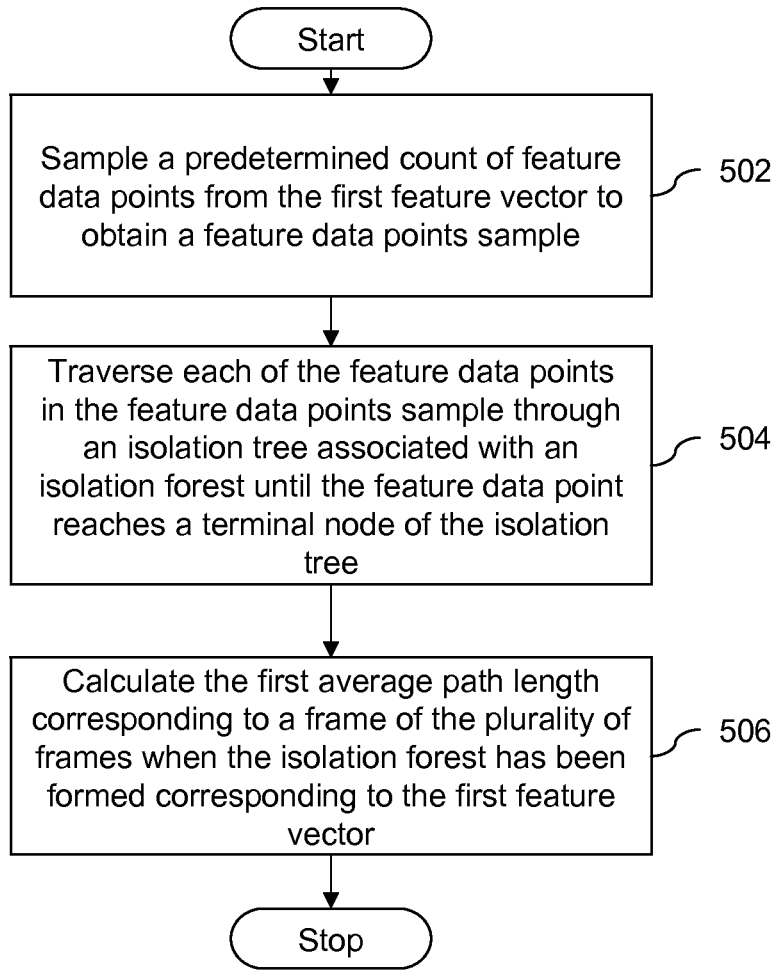
FIG. 5 is a flowchart of a method for performing anomaly detection on the first feature vector to obtain a first average path length based on isolation forest approach, in accordance with an example embodiment of the present disclosure.

Referring now to FIG. 5, a flowchart of a method for performing anomaly detection on the first feature vector to obtain a first average path length based on the isolation forest approach, in accordance with an example embodiment of the present disclosure is shown.

In block 502, a predetermined count of feature data points is sampled from the first feature vector to obtain a feature data points sample. In block 504, each of the feature data points in the feature data points sample is traversed through an isolation tree associated with an isolation forest until the feature data point reaches a terminal node of the isolation tree. The isolation forest includes a predetermined count of isolation trees and the feature data point is traversed based on a set of split dimension and split value located at each internal node of the isolation tree and a corresponding split attribute. In an embodiment of the present invention, the plurality of split attributes corresponding to a plurality of internal nodes of a plurality of isolation trees are obtained based on a previous training phase of the isolation forest. In block 506, the first average path length corresponding to a frame of the plurality of frames is calculated when the isolation forest has been formed corresponding to the first feature vector.

Figure 6:
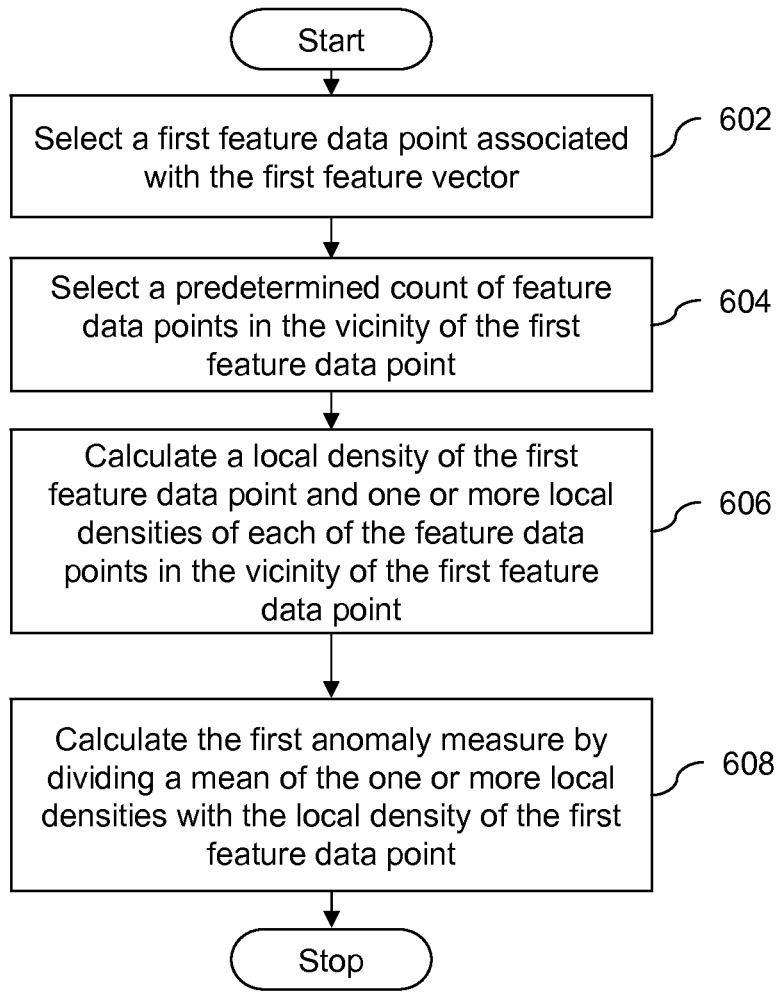
FIG. 6 is a flowchart of a method for performing anomaly detection on the first feature vector to obtain the first average path length based on nearest neighbour approach, in accordance with an example embodiment of the present disclosure.

Referring now to FIG. 6, a flowchart of a method for performing anomaly detection on the first feature vector to obtain a first anomaly measure based on the nearest neighbor approach, in accordance with an example embodiment of the present disclosure is shown.

In block 602, a first feature data point associated with the first feature vector is selected. In block 604, a local density of the first feature data point and one or more local densities of each of the feature data points in the vicinity of the first feature data point is calculated. In block 606, the first anomaly measure is calculated by dividing a mean of the one or more local densities with the local density of the first feature data point. The anomaly measure provides a quantification of a degree of anomaly possessed by the first feature data point.

Figure 7:
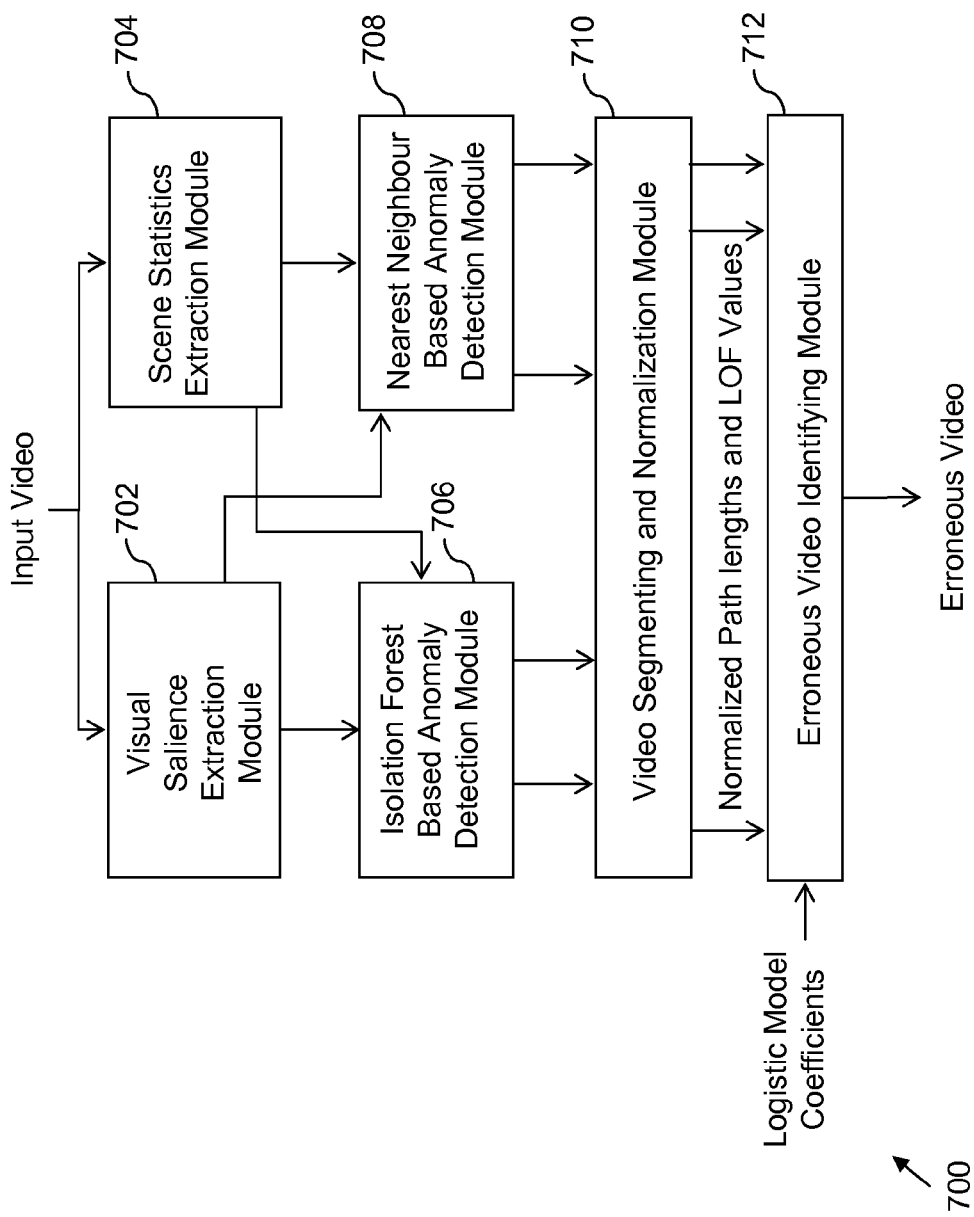
FIG. 7 is a block diagram of a system for identifying an erroneous video from one or more videos, in accordance with an example embodiment of the present disclosure.

FIG. 7 is a block diagram of a system 700 for identifying an erroneous video from one or more videos, in accordance with an example embodiment of the present disclosure. The system 700 includes a visual salience extraction module 702, a scene statistics extraction module 704, an isolation forest based anomaly detection module 706, a nearest neighbour based anomaly detection module 708, a video segmenting and normalization module 710, and an erroneous video identifying module 712.

The visual salience extraction module 702 is provided an input video for generating for generating a first feature vector corresponding to a first frame of the plurality of frames of the input video based on a visual salience extraction approach. The visual salience extraction module 702 calculates one or more feature maps corresponding to each of an intensity channel and one or more colour channels. The feature maps are calculated using at least one of a discrete cosine transform (DCT), inverse DCT, and signum functions. The visual salience extraction module 702 generates a cumulative feature map using one or more weight factors to combine the one or more feature maps. The cumulative feature map is a grayscale image equivalent of a frame of the plurality of frames. Subsequently, the visual salience extraction module 702 applies an edge detection on the cumulative feature map to filter one or more edges present therein and generates a filtered feature map including the one or more edges, obtains a frequency distribution of one or more intensity values associated with the filtered feature map and corresponding pixel count, and generates the first feature vector using the frequency distribution. The first feature vector includes a first plurality of feature data points.

The scene statistics extraction module 704 receives the input video for generating a second feature vector corresponding to the first frame of the plurality of frames based on a scene statistics extraction approach. The scene statistics extraction module 704 divides the first frame into one or more blocks based on a resolution of the frame, selects a block from the one or more blocks, selects a first pixel of a plurality of pixels associated with the block, calculates intensity value mean and variance of one or more pixels in a vicinity of the first pixel, subtracts the intensity value mean from an intensity value of the first pixel to obtain a first mean subtracted intensity value, and divides the mean subtracted intensity value with the intensity value variance to generate a MSVN coefficient corresponding to the first pixel. Further, the scene statistics extraction module 704 fits one or more MSVN coefficients calculated corresponding to the plurality of pixels associated with the block in a generalized Gaussian distribution. The one or more MSVN coefficients are fitted by estimating at least one of mean, variance, and one or more shape parameters. Subsequently, the scene statistics extraction module 704 calculates a statistical correlation coefficient between products of the one or more MSVN coefficients that correspond to the block and products of one or more MSVN coefficients that correspond to a set of blocks in the vicinity of the block and fits one or more statistical correlation coefficients obtained corresponding to the set of blocks in asymmetrical generalized Gaussian distribution. The one or more MSVN coefficients are fitted by estimating at least one of a left shape parameter, right shape parameter, mean, and variance. Thereafter, the scene statistics extraction module 704 generates a feature vector corresponding to the block based on the at least one of the left shape parameter, right shape parameter, mean and variance and concatenates a plurality of feature vectors generated corresponding to the set of blocks to generate the second feature vector. In an embodiment of the present invention, the second feature vector includes a plurality of feature data points.

The isolation forest based anomaly detection module 706 receives the first and second feature vectors from the visual salience extraction module 702 and the scene statistics extraction module 704, respectively. The isolation forest based anomaly detection module 706 performs anomaly detection on the first and second feature vectors to obtain first and second average path lengths based on an isolation forest approach. The isolation forest based anomaly detection module 706 samples a predetermined count of feature data points from the first feature vector to obtain a feature data points sample and traverses each of the feature data points in the feature data points sample through an isolation tree associated with an isolation forest until the feature data point reaches a terminal node of the isolation tree. The isolation forest includes a predetermined count of isolation trees, the feature data point is traversed based on a set of split dimension and split value located at each internal node of the isolation tree and a corresponding split attribute, and a plurality of split attributes corresponding to a plurality of internal nodes of a plurality of isolation trees are obtained based on a previous training phase of the isolation forest. The isolation forest based anomaly detection module 706 calculates the first average path length corresponding to a frame of the plurality of frames when the isolation forest has been formed corresponding to the first feature vector.

The nearest neighbor based anomaly detection module 708 receives the first and second feature vectors from the visual salience extraction module 702 and the scene statistics extraction module 704 and performs anomaly detection on the first and second feature vectors to obtain first and second anomaly measures based on a nearest neighbor approach. The nearest neighbor based anomaly detection module 708 selects a first feature data point associated with the first feature vector, selects a predetermined count of feature data points in the vicinity of the first feature data point, calculates a local density of the first feature data point and one or more local densities of each of the feature data points in the vicinity of the first feature data point., and calculates the first anomaly measure by dividing a mean of the one or more local densities with the local density of the first feature data point.

The video segmenting and normalization module 710 receives the first and second average path lengths from the isolation forest based anomaly detection module 706 and the first and second anomaly measures from the nearest neighbor based anomaly detection module 708. The video segmenting and normalization module 710 segments each of the one or more videos into one or more video shots, in which each of the one or more video shots includes a set of frames. The video segmenting and normalization module 710 determines first and second sets of average path lengths and first and second sets of anomaly measures corresponding to a first set of frames associated with a first video shot, determines first and second maximum average path lengths of the first and second sets of average path lengths, respectively, determines first and second maximum anomaly measures of the first and second sets of anomaly measures, respectively, and divides each of the first and second sets of average path lengths with the first and second maximum average path lengths, respectively, to obtain first and second sets of normalized average path lengths. Subsequently, the video segmenting and normalization module 710 divides each of the first and second sets of anomaly measures with the first and second maximum anomaly measures, respectively, to obtain first and second sets of normalized anomaly measures and determines a plurality of first and second sets of normalized average path lengths and a plurality of first and second sets of normalized anomaly measures corresponding to one or more sets of frames corresponding to the one or more video shots.

The erroneous video identifying module 712 identifies the erroneous video by providing at least one of the plurality of first and second sets of normalized average path lengths and at least one of the plurality of first and second sets of anomaly measures to a regression model. In an embodiment of the present invention, the regression model includes a plurality of model coefficients determined previously using a set of training videos. The regression model is a logistic model.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

Although the present disclosure has been described in detail, it should be understood that various changes, substitutions and alterations may be made thereto without departing from the spirit and scope of the invention as defined by the appended claims.

What is claimed is:

1. A method for identifying an erroneous video from one or more videos, each of the one or more videos including a plurality of frames, the method comprising:

generating first and second feature vectors for each of the plurality of frames of the one or more videos based on visual salience and scene statistics extraction approaches, respectively, wherein each of the first and second feature vectors includes a plurality of feature data points;

performing anomaly detection on the first and second feature vectors based on an isolation forest approach to calculate first and second average path lengths, respectively, corresponding to each of the plurality of frames;

performing anomaly detection on the first and second feature vectors based on a nearest neighbour approach to calculate first and second anomaly measures, respectively, corresponding to each of the plurality of frames;

segmenting each of the one or more videos into one or more video shots, wherein each of the one or more video shots includes a set of frames;

determining first and second sets of average path lengths and first and second sets of anomaly measures corresponding to a first set of frames associated with a first video shot, wherein the first set of average path lengths includes a plurality of first average path lengths calculated corresponding to the first set of frames based on the isolation forest approach and the second set of average path lengths includes a plurality of second average path lengths calculated corresponding to the first set of frames based on the isolation forest approach, wherein the first set of anomaly measures includes a plurality of first anomaly measures calculated corresponding to the first set of frames based on the nearest neighbour approach and the second set of anomaly measures includes a plurality of second anomaly measures calculated corresponding to the first set of frames based on the nearest neighbour approach;

determining first and second maximum average path lengths of the first and second sets of average path lengths, respectively;

determining first and second maximum anomaly measures of the first and second sets of anomaly measures, respectively;

dividing each of the first and second sets of average path lengths with the first and second maximum average path lengths, respectively, to obtain first and second sets of normalized average path lengths;

dividing each of the first and second sets of anomaly measures with the first and second maximum anomaly measures, respectively, to obtain first and second sets of normalized anomaly measures;

determining a plurality of first and second sets of normalized average path lengths and a plurality of first and second sets of normalized anomaly measures corresponding to one or more sets of frames corresponding to the one or more video shots; and identifying the erroneous video by providing at least one of the plurality of first and second sets of normalized average path lengths and at least one of the plurality of first and second sets of anomaly measures to a regression model including a plurality of model coefficients determined previously using a set of training videos.

2. The method of claim 1, wherein generating the first feature vector based on the visual salience extraction approach includes:

calculating one or more feature maps corresponding to each of an intensity channel and one or more colour channels, wherein the feature maps are calculated using at least one of a discrete cosine transform (DCT), inverse DCT, and signum functions;

generating a cumulative feature map using one or more weight factors to combine the one or more feature maps, wherein the cumulative feature map is a gray-scale image equivalent of a frame of the plurality of frames;

applying edge detection on the cumulative feature map to filter one or more edges present therein and generate a filtered feature map including the one or more edges; and obtaining a frequency distribution of one or more intensity values associated with the filtered feature map and corresponding pixel count.

3. The method of claim 1, wherein generating the first feature vector based on the visual salience extraction approach includes:

calculating one or more feature maps corresponding to each of an intensity channel and one or more colour channels, wherein the feature maps are calculated using at least one of a DCT, inverse DCT, and signum functions;

generating a cumulative feature map using one or more weight factors to combine the one or more feature maps, wherein the cumulative feature map is a gray-scale image equivalent of a frame of the plurality of frames;

dividing the cumulative feature map into one or more blocks of a predetermined size;

calculating one or more net salience values for the one or more blocks, wherein a net salience value corresponding to a block is obtained by summing one or more intensity values associated with the block weighted with corresponding pixel count;

sorting the one or more net salience values in descending order; and truncating a predetermined count of net salience values from the one or more net salience values to generate the first feature vector.

4. The method of claim 1, wherein generating the second feature vector based on the scene statistics extraction approach includes:

dividing a frame of the plurality of frames into one or more blocks based on a resolution of the frame;

selecting a block of the one or more blocks;

selecting a first pixel of a plurality of pixels associated with the block;

calculating intensity value mean and variance of one or more pixels in a vicinity of the first pixel;

subtracting the intensity value mean from an intensity value of the first pixel to obtain a first mean subtracted intensity value;

dividing the mean subtracted intensity value with the intensity value variance to generate a mean subtracted and variance normalized (MSVN) coefficient corresponding to the first pixel;

fitting one or more MSVN coefficients calculated corresponding to the plurality of pixels associated with the block in a generalized Gaussian distribution by estimating at least one of mean, variance, and one or more shape parameters;

calculating a statistical correlation coefficient between products of the one or more MSVN coefficients that correspond to the block and products of one or more MSVN coefficients that correspond to a set of blocks in the vicinity of the block;

fitting one or more statistical correlation coefficients obtained corresponding to the set of blocks in asymmetrical generalized Gaussian distribution by estimating at least one of a left shape parameter, right shape parameter, mean and variance;

generating a feature vector corresponding to the block based on the at least one of the left shape parameter, right shape parameter, mean and variance; and concatenating a plurality of feature vectors generated corresponding to the one or more blocks to generate the second feature vector.

5. The method of claim 1, wherein performing anomaly detection on the first feature vector to obtain the first average path length based on the isolation forest approach includes:

sampling a predetermined count of feature data points from the first feature vector to obtain a feature data points sample;

traversing each of the feature data points in the feature data points sample through an isolation tree associated with an isolation forest until the feature data point reaches a terminal node of the isolation tree, wherein the isolation forest includes a predetermined count of isolation trees, wherein the feature data point is traversed based on a set of split dimension and split value located at each internal node of the isolation tree and a corresponding split attribute, wherein a plurality of split attributes corresponding to a plurality of internal nodes of a plurality of isolation trees are obtained based on a previous training phase of the isolation forest; and calculating the first average path length corresponding to a frame of the plurality of frames when the isolation forest has been formed corresponding to the first feature vector.

6. The method of claim 1, wherein performing anomaly detection on the first feature vector to obtain the first anomaly measure based on the nearest neighbour approach includes:

selecting a first feature data point associated with the first feature vector;

selecting a predetermined count of feature data points in the vicinity of the first feature data point;

calculating a local density of the first feature data point and one or more local densities of each of the feature data points in the vicinity of the first feature data point; and calculating the first anomaly measure by dividing a mean of the one or more local densities with the local density of the first feature data point.

7. The method of claim 1, wherein the regression model is a logistic regression model.

8. A system for identifying an erroneous video from one or more videos, each of the one or more videos including a plurality of frames, the system comprising:

a. a visual salience extraction module for generating a first feature vector corresponding to a first frame of the plurality of frames based on a visual salience extraction approach by performing steps comprising:

calculating one or more feature maps corresponding to each of an intensity channel and one or more colour channels, wherein the feature maps are calculated using at least one of a discrete cosine transform (DCT), inverse DCT, and signum functions;

generating a cumulative feature map using one or more weight factors to combine the one or more feature maps, wherein the cumulative feature map is a grayscale image equivalent of a frame of the plurality of frames;

applying edge detection on the cumulative feature map to filter one or more edges present therein and generate a filtered feature map including the one or more edges;

obtaining a frequency distribution of one or more intensity values associated with the filtered feature map and corresponding pixel count; and generating the first feature vector using the frequency distribution, wherein the first feature vector includes a first plurality of feature data points;

b. a scene statistics extraction module for generating a second feature vector corresponding to the first frame of the plurality of frames based on a scene statistics extraction approach by performing steps comprising:

dividing a frame of the plurality of frames into one or more blocks based on a resolution of the frame;

selecting a block of the one or more blocks;

selecting a first pixel of a plurality of pixels associated with the block;

calculating intensity value mean and variance of one or more pixels in a vicinity of the first pixel;

subtracting the intensity value mean from an intensity value of the first pixel to obtain a first mean subtracted intensity value;

dividing the mean subtracted intensity value with the intensity value variance to generate a mean subtracted and variance normalized (MSVN) coefficient corresponding to the first pixel;

fitting one or more MSVN coefficients calculated corresponding to the plurality of pixels associated with the block in a generalized Gaussian distribution by estimating at least one of mean, variance, and one or more shape parameters;

calculating a statistical correlation coefficient between products of the one or more MSVN coefficients that correspond to the block and products of one or more MSVN coefficients that correspond to a set of blocks in the vicinity of the block;

fitting one or more statistical correlation coefficients obtained corresponding to the set of blocks in asymmetrical generalized Gaussian distribution by estimating at least one of a left shape parameter, right shape parameter, mean and variance;

generating a feature vector corresponding to the block based on the at least one of the left shape parameter, right shape parameter, mean and variance; and concatenating a plurality of feature vectors generated corresponding to the one or more blocks to generate the second feature vector, wherein the second feature vector includes a plurality of feature data points;

c. an isolation forest based anomaly detection module for performing anomaly detection on the first and second feature vectors to obtain first and second average path lengths based on an isolation forest approach by performing steps comprising:

sampling a predetermined count of feature data points from the first feature vector to obtain a feature data points sample;

traversing each of the feature data points in the feature data points sample through an isolation tree associated with an isolation forest until the feature data point reaches a terminal node of the isolation tree, wherein the isolation forest includes a predetermined count of isolation trees, wherein the feature data point is traversed based on a set of split dimension and split value located at each internal node of the isolation tree and a corresponding split attribute, wherein a plurality of split attributes corresponding to a plurality of internal nodes of a plurality of isolation trees are obtained based on a previous training phase of the isolation forest; and calculating the first average path length corresponding to a frame of the plurality of frames when the isolation forest has been formed corresponding to the first feature vector;

d. a nearest neighbour based anomaly detection module for performing anomaly detection on the first and second feature vectors to obtain first and second anomaly measures based on a nearest neighbour approach by performing steps comprising:

selecting a first feature data point associated with the first feature vector;

selecting a predetermined count of feature data points in the vicinity of the first feature data point;

calculating a local density of the first feature data point and one or more local densities of each of the feature data points in the vicinity of the first feature data point; and calculating the first anomaly measure by dividing a mean of the one or more local densities with the local density of the first feature data point;

e. a video segmenting and normalization module for performing steps comprising:

segmenting each of the one or more videos into one or more video shots, wherein each of the one or more video shots includes a set of frames;

determining first and second sets of average path lengths and first and second sets of anomaly measures corresponding to a first set of frames associated with a first video shot, wherein the first set of average path lengths includes a plurality of first average path lengths calculated corresponding to the first set of frames based on the isolation forest approach and the second set of average path lengths includes a plurality of second average path lengths calculated corresponding to the first set of frames based on the isolation forest approach, wherein the first set of anomaly measures includes a plurality of first anomaly measures calculated corresponding to the first set of frames based on the nearest neighbour approach and the second set of anomaly measures includes a plurality of second anomaly measures calculated corresponding to the first set of frames based on the nearest neighbour approach;

determining first and second maximum average path lengths of the first and second sets of average path lengths, respectively;

determining first and second maximum anomaly measures of the first and second sets of anomaly measures, respectively;

dividing each of the first and second sets of average path lengths with the first and second maximum average path lengths, respectively, to obtain first and second sets of normalized average path lengths;

dividing each of the first and second sets of anomaly measures with the first and second maximum anomaly measures, respectively, to obtain first and second sets of normalized anomaly measures; and determining a plurality of first and second sets of normalized average path lengths and a plurality of first and second sets of normalized anomaly measures corresponding to one or more sets of frames corresponding to the one or more video shots; and f. an erroneous video identifying module for identifying the erroneous video by providing at least one of the plurality of first and second sets of normalized average path lengths and at least one of the plurality of first and second sets of anomaly measures to a regression model including a plurality of model coefficients determined previously using a set of training videos.

9. The system of claim 8, wherein the regression model is a logistic regression model.

10. A computer program product comprising computer-executable instructions embodied in a non-transitory computer-readable medium for use in connection with a processor-containing system, for executing steps comprising:

generating first and second feature vectors for each of the plurality of frames of the one or more videos based on visual salience and scene statistics extraction approaches, respectively, wherein each of the first and second feature vectors includes a plurality of feature data points;

performing anomaly detection on the first and second feature vectors based on an isolation forest approach to calculate first and second average path lengths, respectively, corresponding to each of the plurality of frames;

performing anomaly detection on the first and second feature vectors based on a nearest neighbour approach to calculate first and second anomaly measures, respectively, corresponding to each of the plurality of frames;

segmenting each of the one or more videos into one or more video shots, wherein each of the one or more video shots includes a set of frames;

determining first and second sets of average path lengths and first and second sets of anomaly measures corresponding to a first set of frames associated with a first video shot, wherein the first set of average path lengths includes a plurality of first average path lengths calculated corresponding to the first set of frames based on the isolation forest approach and the second set of average path lengths includes a plurality of second average path lengths calculated corresponding to the first set of frames based on the isolation forest approach, wherein the first set of anomaly measures includes a plurality of first anomaly measures calculated corresponding to the first set of frames based on the nearest neighbour approach and the second set of anomaly measures includes a plurality of second anomaly measures calculated corresponding to the first set of frames based on the nearest neighbour approach;

determining first and second maximum average path lengths of the first and second sets of average path lengths, respectively;

determining first and second maximum anomaly measures of the first and second sets of anomaly measures, respectively;

dividing each of the first and second sets of average path lengths with the first and second maximum average path lengths, respectively, to obtain first and second sets of normalized average path lengths;

dividing each of the first and second sets of anomaly measures with the first and second maximum anomaly measures, respectively, to obtain first and second sets of normalized anomaly measures;

determining a plurality of first and second sets of normalized average path lengths and a plurality of first and second sets of normalized anomaly measures corresponding to one or more sets of frames corresponding to the one or more video shots; and identifying the erroneous video by providing at least one of the plurality of first and second sets of normalized average path lengths and at least one of the plurality of first and second sets of anomaly measures to a regression model including a plurality of model coefficients determined previously using a set of training videos.

* * * * *